Nov. 7, 1939.　　　W. E. MILLER　　　2,178,726
TRAILER COUPLING
Filed May 10, 1938　　　2 Sheets-Sheet 1
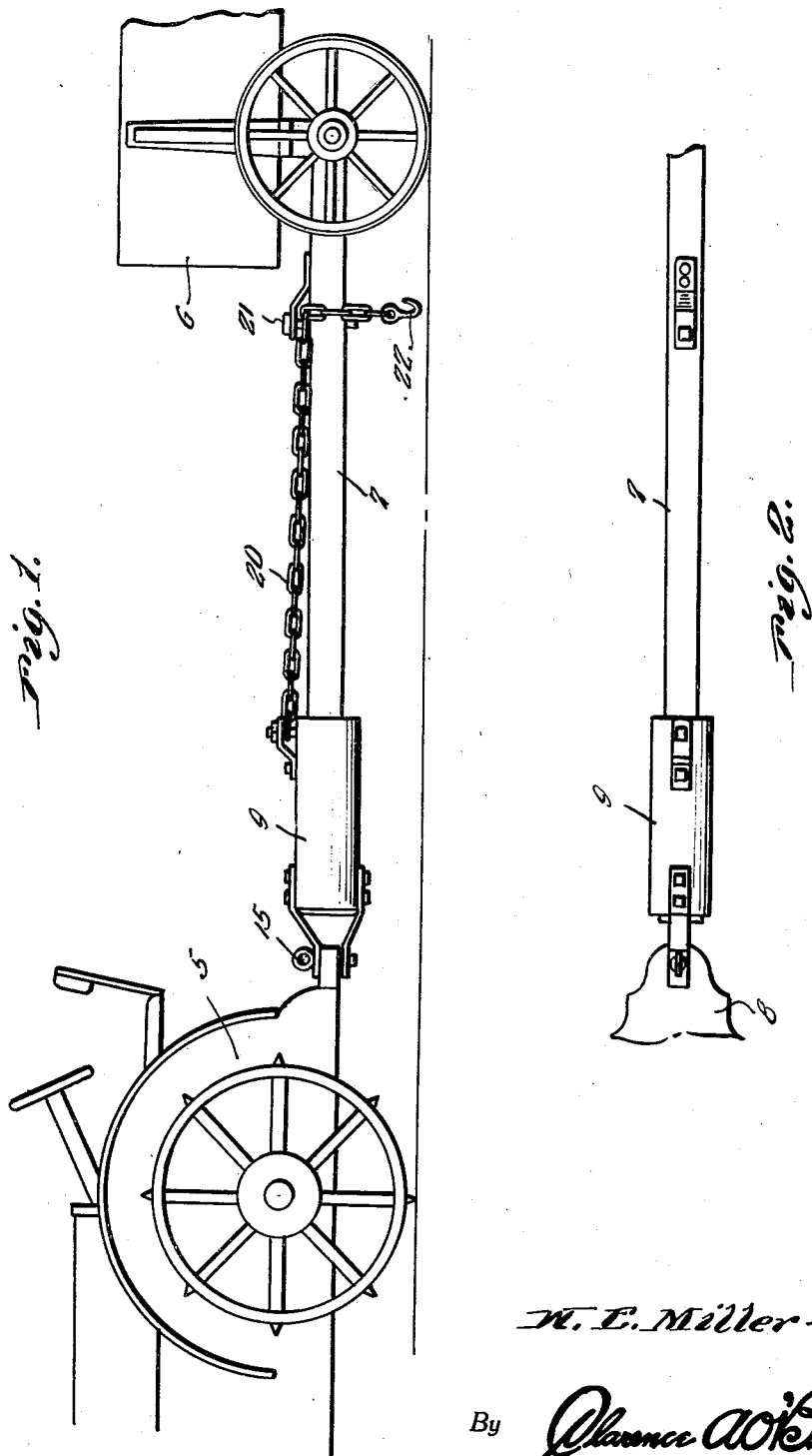
Inventor
W. E. Miller
By Clarence A. O'Brien
and Hyman Berman
Attorneys Nov. 7, 1939.                    W. E. MILLER                    2,178,726
                             TRAILER COUPLING
                           Filed May 10, 1938          2 Sheets-Sheet 2
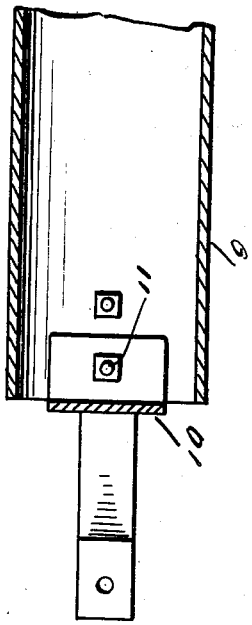
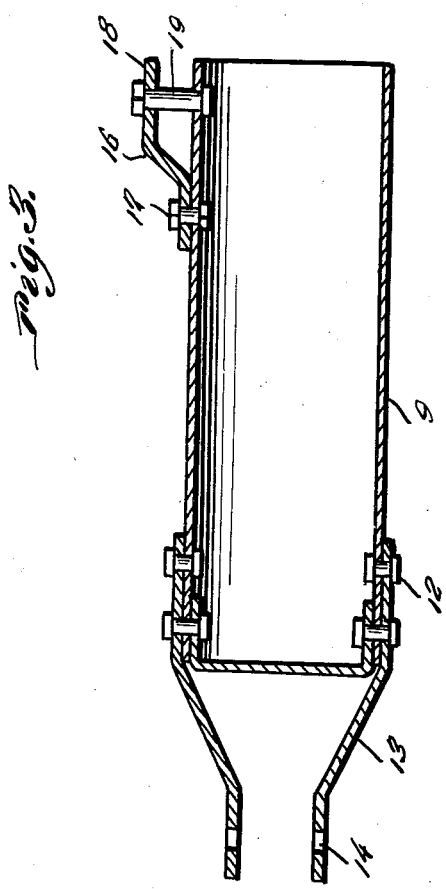
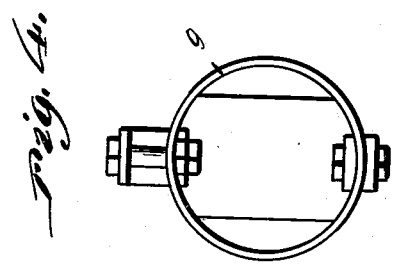
*Inventor*
W. E. Miller
By Clarence A. O'Brien
and Hyman Berman
*Attorneys*

Patented Nov. 7, 1939

2,178,726

UNITED STATES PATENT OFFICE 2,178,726

TRAILER COUPLING

Walter E. Miller, Ann Arbor, Mich., assignor of one-half to Walter Miller, Sr., Ann Arbor Township, Washtenaw County, Mich.

Application May 10, 1938, Serial No. 207,134

2 Claims. (Cl. 280—33.14)

The present invention relates to trailer couplings designed primarily for use in coupling a farm implement to a tractor, automobile, or the like, and has for its primary object to provide a coupling for the implement tongue of the trailing vehicle and embodying means for receiving and supporting the front end of the tongue and also for applying the pulling force to the tongue at a point adjacent its rear end to relieve the front end of the tongue from the strain incident to the pulling thereof, and thus to prevent breaking of the tongue.

A further object is to provide a coupling of this character which enables the backing of the vehicle with facility.

Other objects and advantages reside in the details of construction and manner of operation as more fully hereinafter described and claimed, reference being had to the accompanying drawings forming part hereof, wherein like numerals refer to like parts throughout, and in which—

Figure 1 is a side elevational view.

Figure 2 is a top plan view.

Figure 3 is a longitudinal sectional view through the coupling member.

Figure 4 is a rear elevational view, and

Figure 5 is a fragmentary longitudinal sectional view of the front end of the coupling member.

Referring now to the drawings in detail, wherein for the purpose of illustration I have disclosed a preferred embodiment of the invention, the numeral 5 designates a tractor, and the numeral 6 a farm implement, in the present instance illustrated as a wagon having a pulling tongue 7.

The bracket 5 is provided at its rear end with the usual coupling bracket 8 and to which the coupling member 9 is adapted for connection, said coupling member being of cylindrical form having its rear end open for receiving the front end of the tongue 7 and having its front end obstructed by a U-shaped member 10 having its ends inserted in the forward end of the member 9 and secured thereto by bolts 11. The bolts 11, as well as bolts 12, are utilized for also securing a pair of forwardly extending coupling arms 13 to the coupling member 9, the front ends of the arms 13 being provided with aligned openings 14 for receiving the coupling pin 15 which is inserted through an opening in the tractor bracket 8.

Adjacent the rear end of the coupling member 9 is a plate 16 secured thereto by a bolt or rivet 17 and having its rearwardly extending end in off-set spaced relation from the outer wall of the coupling member as shown at 18 and connected to the coupling member at said off-set portion by a pin 19 to which the forward end of a chain 20 is attached.

After the tongue 7 has been inserted in the coupling member 9 as shown in Figures 1 and 2 of the drawings, the chain 20 is stretched along the top of the tongue and the draw bolt 21 adjacent the rear end of the tongue is inserted through one of the links of the chain whereby it will be apparent that the pulling force is exerted on this draw bolt rather than upon the front end of the tongue. The rear end of the chain is provided with a hook 22 which may be utilized in attaching the chain about the axle of a trailing vehicle in lieu of the draw bolts 21. The coupling member 9 serves as a support for the front end of the tongue and the plate 10 secured at the forward end of the tubular coupling member acts as a stop to limit the forward movement of the tongue.

It is believed the details of construction and manner of operation of the device will be readily understood from the foregoing, without further detailed explanation.

Having thus described the invention, what I claim is—

1. A trailer coupling comprising a tubular member, a U-shaped member having its bight portion extending transversely of the front end of the tubular member and secured thereto to form a stop for the front end of a draft tongue of a trailer when inserted in the open end of said tubular member, a pair of spaced coupling members projecting forwardly from the front end of said tubular member and having coupling pin accommodating openings for connecting to a pulling vehicle bolts carried by the tubular member providing common fastening means for both the U-shaped member and the coupling members and attaching means at the other end of the tubular member to retain the draft tongue therein.

2. A trailer coupling comprising a tubular member having means at one end for attaching to a coupling pin of a draft vehicle, a chain attaching bracket at the other end of said member comprising an elongated plate having one end secured to the outer surface of the member adjacent said other end, the other end of the bracket being off-set in spaced relation from the member and a chain attaching pin connecting the said offset end with the member, said pin having a head within the member for engagement by a draft tongue when inserted in the member to prevent displacement of the pin.

WALTER E. MILLER.